(12) United States Patent
Haglid

(10) Patent No.: US 9,920,939 B2
(45) Date of Patent: Mar. 20, 2018

(54) DEHUMIDIFER/COOLER AND METHOD

(76) Inventor: Klas C. Haglid, Ridgewood, NJ (US)

(*) Notice: Subject to any disclaimer, the term of this patent is extended or adjusted under 35 U.S.C. 154(b) by 2491 days.

(21) Appl. No.: 11/982,210

(22) Filed: Oct. 31, 2007

(65) Prior Publication Data

US 2008/0173438 A1 Jul. 24, 2008

Related U.S. Application Data

(63) Continuation-in-part of application No. 11/656,110, filed on Jan. 22, 2007.

(51) Int. Cl.
| | | |
|---|---|---|
| *F24F 11/04* | (2006.01) | |
| *F24F 3/14* | (2006.01) | |
| *F24F 13/30* | (2006.01) | |

(52) U.S. Cl.
CPC ............ *F24F 3/1405* (2013.01); *F24F 13/30* (2013.01); *F24F 11/77* (2018.01); *Y02B 30/746* (2013.01)

(58) Field of Classification Search
CPC .......... F24F 3/1405; F24F 13/30; F24F 11/77; Y02B 30/746
USPC ......... 165/112, 913, 114, 901, 54, 120, 165, 165/103, 111, 45, 167, 96, 121, 122
See application file for complete search history.

(56) References Cited

U.S. PATENT DOCUMENTS

| | | | | |
|---|---|---|---|---|
| 2,128,641 | A | * | 8/1938 | Folsom ........................ 62/285 |
| 5,259,203 | A | | 11/1993 | Engel et al. |
| 5,277,036 | A | * | 1/1994 | Dieckmann et al. ........... 62/291 |
| 5,913,360 | A | * | 6/1999 | Stark .............................. 165/66 |
| 6,176,305 | B1 | * | 1/2001 | Haglid .......................... 165/231 |
| 6,289,974 | B1 | | 9/2001 | DeGregoria et al. |
| 6,364,007 | B1 | * | 4/2002 | Fischer ......................... 165/166 |
| 2001/0032714 | A1 | | 10/2001 | Haglid |
| 2002/0164944 | A1 | | 11/2002 | Haglid |

OTHER PUBLICATIONS

Official Action dated Jul. 2, 2008 for the PCT application PCT/US2008/000863.

* cited by examiner

*Primary Examiner* — Travis Ruby
(74) *Attorney, Agent, or Firm* — Gregor N. Neff

(57) ABSTRACT

The dehumidifier uses an all-plastic air-to-air heat exchanger together with an integral chiller to cool the incoming air to remove water vapor, and then exchange heat with incoming air to cool the incoming air and re-heat the outgoing air. The degree of dehumidification and the temperature of the outgoing air can be controlled by varying the speed of a variable speed fan so as to provide varying degrees of cooling as well as dehumidification. A programmable controller can be used to operate the dehumidifier automatically, either together with a humidistat and thermostat, or in accordance with a predetermined time profile for the conditioned space.

10 Claims, 1 Drawing Sheet

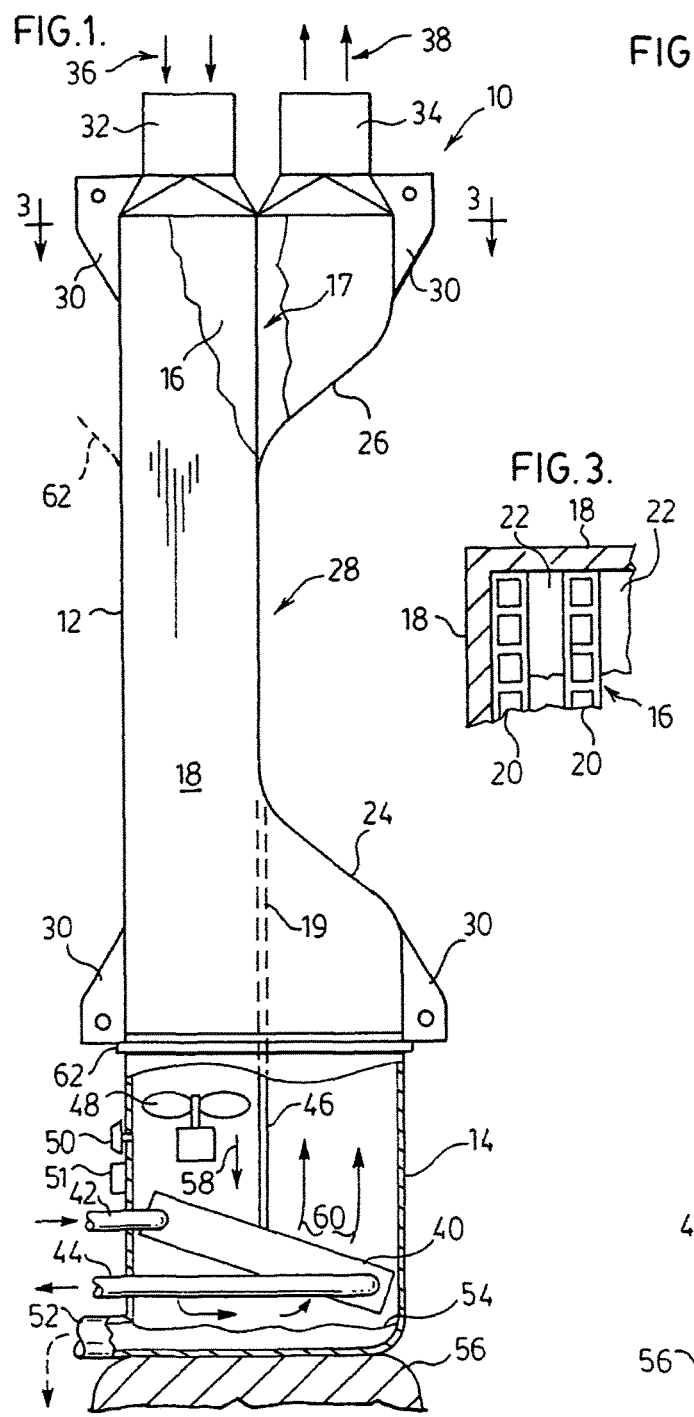

DEHUMIDIFER/COOLER AND METHOD

This patent application is a continuation-in-part of U.S. patent application Ser. No. 11/656,110 filed Jan. 22, 2007. The disclosure of that patent application hereby is incorporated herein by reference.

The present invention relates to dehumidifiers and methods, and particularly to dehumidifiers and methods which provide dehumidification alone, or provide both dehumidification and cooling.

Modern refrigeration type air conditioning long has provided dehumidification as well as cooling for indoor spaces. However, changes in recent years in modern air conditioning equipment and buildings in which they operate have tended to reduce the effectiveness of the dehumidification provided by such equipment.

For example, because of rapidly rising energy costs, modern air conditioning equipment has been designed to be much more energy efficient than in the past. In addition, because of the potentially adverse effects of certain prior refrigerants when released into the atmosphere, changes in refrigerants used also have occurred.

Newer building designs have resulted in "tighter" buildings to minimize unwanted heat transfer between the interior and exterior of the building. This tends to reduce the venting of moisture from within the building when needed.

Changes in the capacity of air conditioning equipment used also has reduced the dehumidification produced by the equipment. For example, equipment for large spaces such as schools, auditoriums, etc., must be designed to provide adequate cooling when large crowds of people impose maximum heat loads. The result is that, at most other times, the equipment is running at far below its maximum capacity, and the dehumidification capability of the equipment is significantly reduced, with the result that the space to be conditioned will be sufficiently cool but excessively humid.

As another example, standard air conditioning equipment often does not adequately control humidity on cool, rainy days.

For the foregoing and other reasons, stand-alone dehumidification equipment which provides dehumidification with little or no cooling is increasingly in demand.

Stand-alone dehumidification units currently are available. Usually, they use integral refrigeration units to dehumidify by cooling and condensing the water vapor from the air. However, such units either issue the air at excessively cool temperatures, or require special electrical or other heating sources to reheat the air to a desired room temperature. Usually, such units are relatively inefficient.

In the past, systems have been proposed in which a refrigeration unit is combined with a heat exchanger, with the heat exchanger being used to extract heat from the incoming air and restore heat to the outgoing air to prevent it from being issued at excessively cold temperatures. However, such units are not known to have been commercially exploited, and generally have been considered to be excessively expensive and/or impractical.

Accordingly, it is a principal object of the invention to provide a dehumidification or dehumidification/cooling system which overcomes or ameliorates the foregoing problems.

In particular, it is an object of the present invention to provide a dehumidifier/cooler and method which has a relatively high efficiency and correspondingly modest power consumption, while being made of long lasting and reliable components, and yet is not excessively expensive.

It is a specific object of the invention to provide such a device which can use any of a plurality of different types of chiller, is capable of producing condensate from the air which is usable, and which is capable of dehumidifying room air and restoring its temperature to around the starting temperature of the air so as to not add cooling, unless such cooling is desired.

It is a further object of the invention to provide a controllable dehumidifier/cooler with a programmed controller to automatically control the dehumidification/cooling produced by the unit in accordance with the specific needs of the space being conditioned.

In accordance with the present invention, the foregoing objects are met by the provision of a highly efficient plastic heat exchanger integrated with a chiller and an air handler for drawing in air from a interior space to be conditioned, chilling the air for dehumidification, and exhausting the air output from the chiller through the heat exchanger to use the heat of the incoming air to raise the temperature of the outgoing air to around room temperature.

The heat exchanger preferably is made of plastic, and has a core made of plastic panels made of integral tubes forming a first set of passages, and spacers separating the panels from one another to form second passages between the panels, and using the two separate sets of passages for incoming and outgoing air to highly efficiently transfer heat between the two air streams.

The core preferably has a solid plastic walls forming a housing around it, with inlets and outlets to the respective passages in a manner so as to produce counter-flow heat exchange between the air masses over at least a portion of the length of the heat exchanger. Preferably, the heat exchanger is elongated to give maximum counter-flow heat exchange, and stands vertically on a base forming a housing interconnecting the two sets of passages and housing the chiller and fan equipment, thereby providing excellent drainage and collection of the condensate.

It also is preferred that the air handler comprises a variable speed fan, whose speed can be controlled to provide either more or less dehumidification and cooling in an amount which is an inverse function of the amount of humidification, so that the unit can both cool and dehumidify, if necessary.

The operation of the dehumidifier/cooler can be semi-automatic or fully automated by use of a controller with a stored program which can be based upon maintaining predetermined levels of humidity and cooling, or on a building or building space profile supplying a desired level of operation at given times and circumstances.

The foregoing and other objects and advantages of the invention will be set forth in or apparent from the following description and drawings.

IN THE DRAWINGS

FIG. 1 is a side elevation view, partially broken-away, showing a preferred embodiment of the invention with multiple variations;

FIG. 2 is a front elevation view of the device shown in FIG. 1; and

FIG. 3 is a broken-away cross-sectional view taken along line 3-3 of FIG. 1 illustrating the construction of the heat exchanger core and housing.

GENERAL DESCRIPTION

FIG. 1 shows a dehumidifier/cooler 10 constructed in accordance with the present invention. The unit 10 includes an elongated, vertically oriented plastic heat exchanger 12 with an added housing 14 secured to the housing of the heat exchanger 12 and forming a base upon which the unit 10 rests on a supporting surface 56.

The heat exchanger 12 shown in FIGS. 1 and 2 is substantially the same as that described in detail in my above-identified co-pending U.S. patent application Ser. No. 11/656,110. Since that description has been incorporated by reference herein, the heat exchanger will not be discussed in great detail here. However, the heat exchanger has an elongated core 16 and a housing 18 with solid plastic walls surrounding the core except at the top and bottom ends of the core 16, and in areas such as areas 17 and 19 where extensions 26 and 24, respectively, provide inlet and outlet fixtures for guiding air into and out of the spaces between the parallel panels 20 of the core (see FIG. 3).

As it is shown in FIG. 3, each of the panels 20 has a plurality of elongated tubes secured together to form multiple parallel air flow passages. Spacers 22 space the panels 20 apart from one another and form passages between the panels to conduct air between them.

In the central section 28 of the heat exchanger, the passages formed by the panels 20 and the spaces in between them conduct gas in substantially opposite directions for a substantial distance, thereby providing highly efficient counter-flow heat exchange over much of the length of the heat exchanger. At the upper ends of the core 16 and the outlet extension 26 are attached two fittings 32 and 34 which are provided to allow tubular duct work to be attached to conduct the air to and from various intake and outlet points in the conditioned space.

The bottom housing portion 14 is secured to the housing portion 18 of the heat exchanger at a joint 62. Desirably, flanges can be provided at the upper edge of the housing 14 and the lower edge of the housing 18 to enable the two units to be fastened together at the joint 62 by threaded fasteners. The joint can be sealed as needed.

Mounting flanges 30 are provided on the outside of housing 18 to enable the unit to be secured to wall brackets or other appropriate structures.

Mounted in the lower housing 14 is a heat exchanger 40 of conventional construction (e.g., metal) which is adapted to accept chilled water through an inlet conduit 42. The chilled water flows through a series of coils over which air to be dehumidified passes, and the warmed water exits out through an outlet conduit 44. This unit is adapted to accept chilled water from a unit in a building which already provides the same, as is customary in many public buildings such as schools, auditoriums, etc.

The housing 14 has a vertical partition 46 in the center which separates the two air flows coming into and leaving the housing 14 from one another. The partition 46 makes certain that air will pass through the heat exchanger 40.

Mounted in the incoming air conduit is a air handler 48, specifically, a variable speed fan. The fan pulls air in through the inlet fitting 32 and through the passages in the panels 20 of the heat exchanger, and pushes the air through the heat exchanger 40 along the path 58. The air exits from the heat exchanger 40 at 60 and returns through the extension 24, the passages between the panels 20, out through the extension 26 and the exhaust fitting 34 where the air is distributed to locations at which it is needed.

The chiller coils 40 are at a relatively low temperature, e.g., 40° F. The incoming air is coming in at the usual indoor temperature, say 70° F. It is cooled in the heat exchanger 12 by heat exchange with the outgoing air down to a lower temperature, e.g., 55° F., which causes some water to condense out, and then it is cooled further by the chiller 40 which condenses a substantial additional quantity of water from the air. The condensate accumulates at 54 at the bottom of the housing 14, and is drained outwardly through a drain pipe 52.

The speed of the flow is set so as to produce a desired level of dehumidification, with a preferred outlet air temperature near the inlet temperature. For example, if the inlet temperature is 70° F., the outlet air can have a temperature only slightly lower, e.g., 68° F.

It should be understood that the heat exchanger and housing 14 could be rotated 90° so as to be substantially horizontal. However, with the vertical orientation shown, the moisture removed from the air in the heat exchanger 12, and by the chiller 40 drains more readily to the bottom of the housing 14 by gravity so as to insure better dehumidification. The flat rectangular panel of coils 40 is mounted at an angle to horizontal as shown in FIG. 1 so as to assist in draining the water downwardly to the bottom of the housing 14.

A humidifying control knob 50 and an optional programmable controller 51 are provided.

The knob 50 can be used to turn the fan motor on or off manually. Additionally, it also can be used to manually vary the speed of the fan.

In general, increasing the speed of the fan decreases the temperature of the air leaving the unit, and decreases the degree of dehumidification. Conversely, reducing the speed of the fan increases the degree of humidification and increases the temperature of the outgoing air. Thus, by controlling the speed of the fan 48, one can set the unit to provide both dehumidification and cooling, or to provide substantially only dehumidification, as desired.

If desired, the water 54 which accumulates in the bottom of the housing 14 and is drained through the drain 52 can be filtered and otherwise treated for purification purposes, and stored and delivered to a drinking water dispenser. Alternatively, the water can be used for purposes other than drinking. The water is free from groundwater contaminants and minerals.

Control Apparatus and Methods

The device 10 can be controlled in a number of different ways and with a number of different control mechanisms.

One method of control is described above; that is, to manually turn the unit on or off when a need is detected for dehumidification, with or without manual fan speed control.

Automatic control equipment also can be provided. First, a thermostat and/or a humidistat can be provided, the humidistat automatically turning the unit 10 on to provide dehumidification when the humidistat senses a need for same, and increasing the speed of the fan in response to the thermostat detecting a need for cooling. A balance between the two functions can be programmed into the programmable control unit 51, which can be of the type described in my U.S. Pat. No. 6,176,305 or similar equipment.

Alternatively, the on/off and speed controls can be automatically set in accordance with stored program set in accordance with a building or room profile in which the dehumidification and cooling needs of the space are predetermined over a period of time such as one year, and are programmed in accordance with the time of day, day of the week, and time of the year to automatically set the parameters of the fan operation to produce the requisite amount of dehumidification and cooling. Manual override can be provided so as to enable human operators to determine the operation under special circumstances.

The latter control equipment and methods are described in greater detail in my U.S. Pat. No. 7,231,967, the disclosure of which is incorporated herein by reference.

Chillers

In addition to supplying cold water from an existing supply to the heat exchanger 40, other chillers can be used, as those skilled in the art will readily understand.

For example, reference numeral 40 also schematically represents a conventional refrigeration unit which can be mounted in the housing 14. Air from the heat exchanger 12 passes through the coils of the refrigeration unit for cooling. The heat given off by the condenser of the refrigeration unit either can be exhausted to the outside, or can be used to heat the air in the outgoing air stream to re-heat the air to a temperature even higher than it normally would be.

Preferably, the refrigeration unit is operated to provide a temperature in the cooling coils as low as possible without freezing. If desired, a liquid with a low freezing point can be used to assure suitably low temperatures in the cooling coils.

Another alternative to the use of the fan 48 and the chiller unit 40 is to mount a commercially available stand-alone dehumidifier unit in the housing 14. Unit 40 also can be considered to be a schematic representation of such a unit. Such a unit has its own refrigeration coils, fan, etc. The control 50 can simply be the control already provided with such units.

A further embodiment of the chiller is one in which plastic coils are used to replace the metal coils 40 for conducting chilled water. Although many good quality chillers are available which have relatively long lives, even longer lives can be obtained by using a plastic water-to-air heat exchanger.

For example, arrays of so-called "micro capillary" tubes for use in liquid-to-air radiant cooling and heating are sold by companies such as Beka USA. These arrays comprise two large "headers" between which a plurality of elongated plastic tubes extend. If these arrays are wrapped into a coil, and cold water is passed through the headers and tubes, air can be forced past the coils for cooling purposes. Therefore, all-plastic heat exchangers can be used throughout.

Heat Exchangers

Although the heat exchanger 12 shown in the drawings is preferred, other heat exchangers can be used as well.

For example, the heat exchanger 12 as shown in FIG. 1 has a shape somewhat like the letter "C". Instead, a heat exchanger which is the same in principle but with a outline which looks more like the letter "X", as shown in my U.S. Pat. No. 6,983,788, also can be used if the shape of such a heat exchanger is advantageous. The main difference between the two heat exchangers is that instead of the extension 26 extending from the right side of the core 16, it extends from the left side of the core, as is indicated by the dashed line 62. In addition, if the high efficiency of counter-flow heat exchange is not needed, or if the length of the heat exchanger must be short, a cross-flow type heat exchanger can be used instead.

For example, a heat exchanger having a rectangular core and a housing totally enclosing it except at opposed ends of the core and at perpendicular extensions directly opposed to one another can provide a compact, although somewhat less efficient heat exchanger which is usable for the purpose.

The above description of the invention is intended to be illustrative and not limiting. Various changes or modifications in the embodiments described may occur to those skilled in the art. These can be made without departing from the spirit or scope of the invention.

What is claimed is:

1. A dehumidifier comprising
(a) a heat exchanger having an elongated core having a longitudinal axis and being made of plastic material and having first and second sets of longitudinally extending flow passages having a length along said longitudinal axis and said core having a width transverse to said longitudinal axis, said length being greater than said width, and multiple panels of integral side-by-side tubes forming said first passages, and spacers separating said panels from one another forming said second passages between said panels, said first and second sets of passages guiding air flow through said core in opposite directions to produce counter-flow heat exchange in said elongated core, and an elongated first housing enclosing said core and forming a first air opening to said first set of passages at one end and a second air opening at the opposite end of said first passages, and a separate first air opening to said second set of passages at one end and a second air opening at the opposite end of said second passages,
(b) a second housing having at least one wall interconnecting one set of said passages to the other set of said passages at one end thereof, to guide air flow between said first and second sets of passages,
(c) an air chiller in the path between said interconnected ends of said sets of passages, and
(d) an air handler positioned to move air from one of said sets of passages into the other set of passages through said air chiller, and then through the other of said sets of passages.

2. The dehumidifier of claim 1 in which said chiller is selected from the group consisting of a heat exchanger with connections to receive and expel chilled liquid; a refrigeration unit with a heat exchanger; and a self-contained dehumidifier.

3. The dehumidifier of claim 1 in which said elongated housing has solid plastic walls and two extensions, said solid plastic walls enclosing said core with each of said walls parallel to and in contact with one wall of said core across the core wall and along said length of said core to seal said core except at four areas, a first one of said areas forming said first opening to said first passages and a second one of said areas forming said second opening for said first passages, and third and fourth areas, each adjacent one of said two extensions of said enclosure, a first one of said extensions extending outwardly from said core and forming said first opening to said second passages and said second extension forming said second opening for said second passages.

4. The dehumidifier of claim 3 in which said extensions extend outwardly from said core and then bend towards said core to issue or accept air flowing parallel to that flowing in said core at locations selected from the group consisting of: (a) locations on one side wall of said enclosure and (b) opposite side walls of said enclosure, said extensions being spaced from said first opening and said second opening for said first passages.

5. The dehumidifier as in claim 1 in which said first opening of said first passages is positioned above said second opening to said first passages and said longitudinal axis is vertical.

6. The dehumidifier of claim 1 in which said air handler is a variable speed fan with speed control means for controlling the speed of said fan.

7. The dehumidifier of claim 6 including a programmable control device for controlling the speed of said fan to control the degrees of dehumidification and cooling provided by said dehumidifier.

8. A dehumidifier comprising
(a) a heat exchanger having an elongated core made of plastic material, having a longitudinal axis, having multiple panels of integral extruded side-by-side tubes assembled together to form said core with an elongated rectilinear shape having side walls and forming a set of first passages, and multiple spacers located between the opposite ends of and along the length of said panels and separating said panels from one another and forming a set of second passages between said panels, said first and second sets of passages guiding air flow in substantially opposite directions substantially parallel to said longitudinal axis through said core in counter-flow heat exchange over a length of said elongated core, and an elongated first housing having walls contacting said side walls of said core to enclose and seal said core except at a first air opening to said first set of passages at one end and a second air opening at the opposite end of said first passages, and a separate first air opening to said second set of passages at one end and a second air opening at the opposite end of said second passages,
(b) a second housing having at least one wall interconnecting one set of said passages to the other set of said passages at one end thereof, to guide air flow between said first and second sets of passages,
(c) an air chiller in said second housing in the path connecting said sets of passages, and
(d) an air handler positioned in said second housing to move air from one of said sets of passages into the other through said air chiller, and then through the other of said sets of passages,
(e) in which said first opening to said first passages is positioned to intake air to be dehumidified, and said first opening to said second passages is connected to receive air from said second opening for said first passages after said air passes through said chiller.

9. The dehumidifier of claim 8 in which said heat exchanger is positioned with said longitudinal axis extending substantially vertically.

10. The dehumidifier of claim 8 in which said first passages are substantially straight and said first opening and said second opening for said first passages are located at opposed ends of said first passages.

* * * * *